June 17, 1958  C. R. RETZ  2,839,108
END THRUST ROTARY PLANING TOOL
Filed May 3, 1956
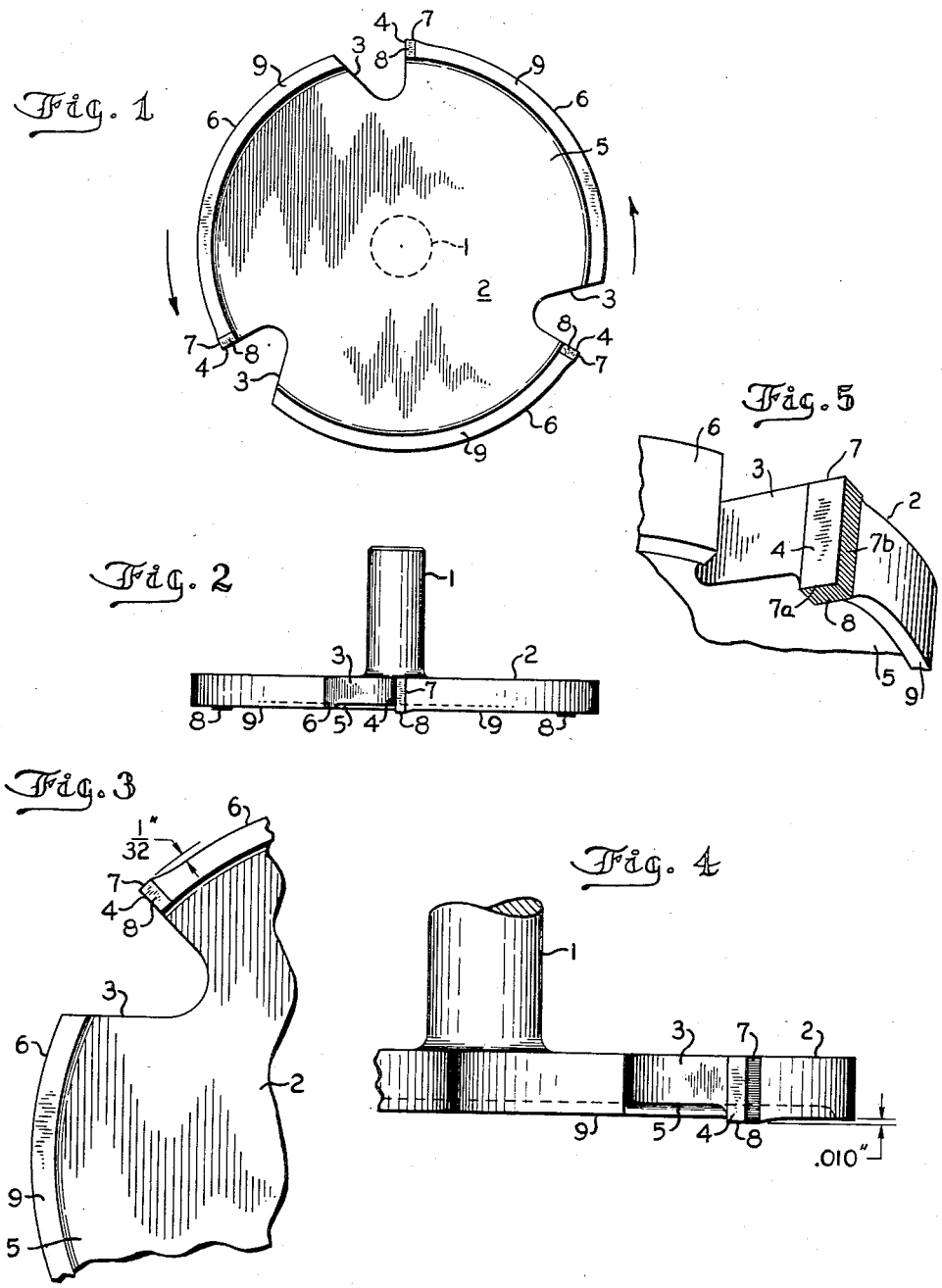
INVENTOR.
CARL R. RETZ
BY
Andrew & Scealer
Attorneys

United States Patent Office 2,839,108
Patented June 17, 1958

2,839,108

END THRUST ROTARY PLANING TOOL

Carl R. Retz, Chippewa Falls, Wis.

Application May 3, 1956, Serial No. 582,409

6 Claims. (Cl. 144—219)

This invention relates to rotary tools for planing wood and the like to a reduced thickness by routing. Such tools are of the type having a shank adapted to be supported and driven as by a spindle and having a disc with a series of cutting teeth to extend downwardly toward the work table. With rotation of the tool, the teeth move across the upper face of the work which is placed on the work table and is held against a guide while being beneath the tool.

According to the invention, the disc is provided with a series of flanges and the forward ends of the flanges respecting the rotation of the tool comprise the cutting teeth. Each flange holds the work to the table while the recessed side of the disc and flange following the respective tooth controls the depth of cut by limiting the feeding of the work toward the tool so that the work can only pass beneath the tool at an even maximum speed for safety and a smoother cut.

An object of the invention is to provide a planer which will not kick the workpiece out from under the tool particularly as at the start of the work.

Another object is to provide a tool which will hold the workpiece to the table at all times particularly including at the start of work.

Another object is to limit the radial cut of each tooth so that each flange passes over the work a minimum number of times to leave a better finished surface.

The drawings furnished herewith illustrate the best mode of carrying out the invention as presently contemplated and set forth hereinafter.

In the drawings:

Figure 1 is a bottom plan view of the tool showing the series of flanges at the periphery of the disc;

Fig. 2 is a side elevation of the tool;

Fig. 3 is an enlarged bottom plan view of a portion of the tool with a radial clearance controlling the radial cut indicated as within the scope of the invention;

Fig. 4 is an enlarged side elevation of a portion of the tool and with the tool rotated counterclockwise from the position of Fig. 2, and with a suggested axial working clearance of the flange following the cutting tooth which is provided only to reduce the effort required to drive the tool; and Fig. 5 is an enlarged detail view of one of the cutting teeth.

The tool as shown in the drawings includes the supporting shank 1 and the disc 2 fixed to the lower end of shank 1. The series of openings 3 formed in disc 2 open outwardly at the periphery of the disc with the side of the opening facing in the direction of rotation defining a plane intersecting the axis of rotation. Each side comprises a cutting face 4 as will be described accordingly having a rake of 0°.

The bottom face of disc 2 is recessed as at 5 to provide the series of annular flanges 6 at the periphery of the disc and which extend between the several openings 3 and project downwardly from the disc.

Each cutting face 4 defines the forward end of the respective flange 6 comprising the cutting tooth 7 having a radially extending sharp corner 7a and an axially extending sharp corner 7b; each sharp corner defining a cutting edge. Corner 7a is advanced axially of the lower face 9 of flange 6, and corner 7b is advanced radially outwardly of the periphery of disc 2.

A radial clearance of approximately 1/32" is provided at the perimeter of disc 2 and following each cutting tooth 7 to allow the work to be fed into the side of the tool.

In the operation of the tool, the distance between the plane defined by the bottom faces 8 of the cutting teeth 7 and the work table, not shown, corresponds to the desired thickness or dimensions of the work. The work is placed on the table and passed lengthwise beneath the tool while held against a guide fixed to the table to hold the work laterally against the action of the cutters as they move across the work.

According to the invention, the work is at all times held to the table by the flanges 6 and particularly at the start of the cut, the work usually being a long piece which cannot be readily held flat on the table. The cutting action of the teeth has a tendency to draw the work up towards the disc. If the work is thin, hold-down clamps will not serve to avoid such action and the tendency is only partially avoided by the 0° rake of the cutting teeth.

In practice, it has been found that a slight clearance as indicated in Fig. 4 will in some cases be advantageous. The clearance referred to is provided behind the several teeth 7 with the bottom faces 9 of the flanges 6 a slightly greater distance from the work table than the bottom faces 8 of teeth 7 to reduce the drag of the flanges. Such clearance, however, does not affect the advantageous functioning of the flanges in holding the work to the table.

In the operation of the tool, the work first engages the periphery of disc 2 and the maximum cut of each tooth corresponds to the radial projection of the teeth beyond the periphery of the disc as indicated in Fig. 3. The work can be fed toward the tool only at the rate allowed by the succession of cuts referred to. The bottom face 8 of each tooth 7 and the bottom faces 9 of flanges 6 should be of a relatively small width so that there is no unnecessary dragging of the tool over the work. However, such width is to be a multiple of the clearance and maximum depth of each radial cut so that the path of the bottom faces 8 of teeth 7 overlap uniformly as the work moves lengthwise at whatever maximum speed is allowed by the succession of cuts. Such overlapping thus provides a smooth finished surface which is assured at all times.

The maximum depth of cut allowed prevents overloading the motor driving the tool and prevents "kickback" which as a safety-factor is favorably comparable to that of certain types of circular saws.

The depth of cut is limited only by the thickness of disc 2 which determines the height of the cutting teeth as formed therein. The tool may also be used as a dado-cutter, and for rabbeting and other similar work.

Various modes of carrying out the invention are contemplated as within the scope of the following claims particularly pointing out and distinctly claiming the subject matter which is regarded as the invention.

I claim:

1. A rotary tool for planing wood and the like which comprises a substantially circular disc having a central shank extending from the upper face of the disc for support and rotation of the disc in predetermined spaced relation to a work table and workpiece guide, said disc having a series of openings at the periphery thereof and a recessed lower face providing a series of peripheral flanges projecting downwardly and extending circumferentially between the respective openings, the sides of said openings facing forwardly respecting rotation of the disc defining sharp corners with the bottom of said flanges and the periphery of the disc, the portions of the disc at said corners being advanced radially of the periphery of the disc and axially of the lower face of the disc to provide a series of cutting teeth, said disc having a radius only slightly less than said portions defining cutting teeth whereby the radial cuts successively allowed by the several teeth are safely limited by said lesser radius, said flanges serving to clear the surface of the work in a series of evenly spaced overlapping strokes as determined by the clearance provided by the teeth at the periphery of the disc and further serving to hold the work to the work table at all times.

2. A circular tool for planing wood and the like by rotary support of the tool in a predetermined spaced relation to a work table and workpiece guide, said tool having a series of openings at the periphery thereof and a series of peripheral flanges extending lengthwise between adjacent openings and axially respecting rotation of the tool so as to project toward the work table, the ends of said flanges facing forwardly respecting rotation of the tool being provided with sharp corners, the portions of the flanges at said corners being advanced radially of the periphery of the tool and axially of the lower face of the tool to provide a series of cutting teeth, said tool having a radius slightly less than the radial dimensions of said portions defining cutting teeth whereby the radial cuts successively allowed by the several teeth are safely limited by said lesser radius, said flanges serving to clear the surface of the work in a series of evenly spaced overlapping strokes as determined by the clearance provided by the teeth at the periphery of the tool and said flanges further serving to hold the work to the work table at all times.

3. A rotary tool for planing wood and the like which comprises a disc having means for rotatably supporting the disc in predetermined spaced relation to a work table and workpiece guide, said disc having a series of openings at the periphery thereof and a recessed face providing a series of peripheral flanges to project toward the work table and extending between the respective openings, the sides of said openings facing forwardly respecting rotation of the disc defining sharp corners with the bottom of said flanges and the periphery of the disc, the portions of the disc at said corners being advanced radially of the periphery of the disc and axially of the lower face of the disc to provide a series of cutting teeth, said cutting teeth being dimensioned to extend only slightly beyond the periphery of the disc whereby the radial cuts successively allowed the several teeth are safely limited to such extent of the teeth, said flanges serving to clear the surface of the work in a series of evenly spaced overlapping strokes as determined by the succession of radial cuts allowed the teeth at the periphery of the disc and further serving to hold the work to the work table at all times.

4. A circular tool for planing wood and the like by rotary support of the tool and including a series of peripheral flanges spaced lengthwise and having flat faces to define a plane normal to the axis of rotation and in predetermined spaced relation to a work table, the forward ends of said flanges respecting rotation of the flanges being advanced radially of the periphery of the tool and axially of the lower face of the tool to provide a series of cutting teeth each with its surfaces trailing the cutting edges for a short distance with zero clearance, said flanges having an outer radius slightly less than the radial dimensions of said cutting teeth whereby the radial cuts successively allowed the several teeth are safely limited by said lesser radius, said flanges serving to clear the surface of the work in a series of evenly spaced overlapping strokes as determined by the clearance provided by the teeth at the periphery of the tool and said flanges further serving to hold the work to the work table at all times.

5. A circular tool for planing wood and the like by rotary support of the tool and including a series of peripheral flanges spaced lengthwise and having flat faces to define a plane normal to the axis of rotation and in predetermined spaced relation to a work table, the forward ends of said flanges respecting rotation of the flanges being advanced radially of the periphery of the tool and axially of the lower face of the tool to provide a series of cutting teeth each with its surfaces trailing the cutting edges for a short distance with zero clearance, said flanges having an outer radius slightly less than the radial dimensions of said cutting teeth whereby the radial cuts successively allowed the several teeth are safely limited by said lesser radius, said flanges serving to clear the surface of the work in a series of evenly spaced overlapping strokes as determined by the clearance provided by the teeth at the periphery of the tool and said flanges further serving to hold the workpiece to the work table at all times, said teeth extending slightly beyond the faces of the respective flanges to provide a working clearance therefor in passing over the surface of the workpiece.

6. An end thrust rotary planing tool, comprising a substantially circular rim facing axially of the tool and having a series of circumferentially spaced openings therein to provide a series of intermediate rim sections of narrow radial extent, the leading end of each rim section presenting a cutting tooth having a corner constituting a radially disposed cutting edge for planing the surface of a workpiece and having its forward edge constituting a cutting edge parallel to the axis of rotation for providing a depth of cut as the workpiece and tool are advanced relatively in the plane of the surface being planed, said leading end of each rim section providing a tooth portion immediately trailing each said cutting edge thereof and being otherwise advanced beyond the axial face of the rim and the circumferential face of the rim to govern the planing action.

References Cited in the file of this patent

UNITED STATES PATENTS

| 452,659 | Berry | May 19, 1891 |
|---|---|---|
| 2,674,281 | Fullmer | Apr. 6, 1954 |
| 2,755,831 | Johnson | July 24, 1956 |

FOREIGN PATENTS

| 902,189 | Germany | Jan. 21, 1954 |
|---|---|---|
| 1,031,934 | France | Mar. 25, 1953 |